(12) United States Patent
Andre et al.

(10) Patent No.: US 10,346,646 B2
(45) Date of Patent: Jul. 9, 2019

(54) COMPONENT FOR HOLDING A MAGNETIC READING HEAD

(71) Applicant: INGENICO GROUP, Paris (FR)

(72) Inventors: Jerome Andre, Montoison (FR); Michel Rossignol, Monteleger (FR); Olivier Berthiaud, Cornas (FR)

(73) Assignee: INGENICO GROUP, Paris (FR)

( * ) Notice: Subject to any disclaimer, the term of this patent is extended or adjusted under 35 U.S.C. 154(b) by 0 days.

(21) Appl. No.: 15/737,148

(22) PCT Filed: Jun. 16, 2016

(86) PCT No.: PCT/EP2016/063966
§ 371 (c)(1),
(2) Date: Dec. 15, 2017

(87) PCT Pub. No.: WO2016/202958
PCT Pub. Date: Dec. 22, 2016

(65) Prior Publication Data
US 2018/0173905 A1    Jun. 21, 2018

(30) Foreign Application Priority Data

Jun. 16, 2015 (FR) ..................................... 15 55514

(51) Int. Cl.
*G06K 7/08* (2006.01)
*G06F 21/71* (2013.01)

(52) U.S. Cl.
CPC ............ *G06K 7/084* (2013.01); *G06F 21/71* (2013.01); *G06K 7/08* (2013.01)

(58) Field of Classification Search
CPC .................... G06K 7/084; G06K 7/08
(Continued)

(56) References Cited

U.S. PATENT DOCUMENTS 5,270,523 A * 12/1993 Chang .................... G06K 7/015
  235/449
6,042,010 A *  3/2000 Kanayama ............. G06K 7/084
  235/379
(Continued)

FOREIGN PATENT DOCUMENTS

CN    203930856 U    11/2014
WO    2005060491 A2    7/2005
(Continued)

OTHER PUBLICATIONS

English Translation of the International Preliminary Report on Patentability dated May 10, 2017 for corresponding International Application No. PCT/EP2016/063966, filed Jun. 16, 2016.
(Continued)

*Primary Examiner* — Paultep Savusdiphol
(74) *Attorney, Agent, or Firm* — David D. Brush; Westman, Champlin & Koehler, P.A.

(57) ABSTRACT

A component for holding a magnetic reading head, and a slotted magnetic card reader comprising a magnetic card reader held by such a component. The holding device includes a single component having at least one perforated plane surface appreciably of the same length and same width as the rear face of the housing of the reading head. The reading head also has two surfaces perpendicular to the perforated plane surface that form two mutually parallel lateral uprights intended to grip the housing of the magnetic reading head, and at least one affixation point.

7 Claims, 3 Drawing Sheets

(58) Field of Classification Search
USPC .......................................................... 235/449
See application file for complete search history.

(56) References Cited

U.S. PATENT DOCUMENTS

| | | | | |
|---|---|---|---|---|
| 6,176,426 | B1* | 1/2001 | Kanayama | G06K 7/084 |
| | | | | 235/379 |
| 6,342,982 | B1* | 1/2002 | Kanayama | G11B 17/0408 |
| | | | | 235/449 |
| 6,927,928 | B2* | 8/2005 | Nakabo | G11B 5/49 |
| | | | | 360/2 |
| 7,347,370 | B2* | 3/2008 | McJones | G06K 7/083 |
| | | | | 235/449 |
| 2002/0093749 | A1* | 7/2002 | Nakabo | G11B 5/49 |
| | | | | 360/2 |
| 2005/0150955 | A1* | 7/2005 | McJones | G06K 7/083 |
| | | | | 235/449 |
| 2015/0097033 | A1* | 4/2015 | Yanko | G06K 7/083 |
| | | | | 235/449 |

FOREIGN PATENT DOCUMENTS

| | | |
|---|---|---|
| WO | 2006032824 A2 | 3/2006 |
| WO | 2015014112 A1 | 2/2015 |

OTHER PUBLICATIONS

International Search Report dated Jul. 21, 2016 for corresponding International Application No. PCT/EP2016/063966, filed Jun. 16, 2016.

Written Opinion of the International Searching Authority dated Jul. 21, 2016 for corresponding International Application No. PCT/EP2016/063966, filed Jun. 16, 2016.

* cited by examiner

COMPONENT FOR HOLDING A MAGNETIC READING HEAD

1. CROSS-REFERENCE TO RELATED APPLICATION

This Application is a Section 371 National Stage Application of International Application No. PCT/EP2016/063966, filed Jun. 16, 2017, the content of which is incorporated herein by reference in its entirety, and published as WO 2016/202958 on Dec. 22, 2016, not in English.

2. FIELD OF THE INVENTION

The invention relates to an element for holding a housing of a magnetic reading head, especially for a slotted magnetic card reader known as a "swipe reader"

Such slotted magnetic card readers or swipe readers are for example used in payment terminals or in access control systems that make it possible, through a magnetic memory card, respectively to make purchases or access a secured site. The magnetic memory card comprises one or more stripes generally disposed on the back of the card according to ISO 7811 standard.

A large proportion of cards, especially in Europe, are called multimode cards because, in addition to the magnetic stripe, they also comprise an electronic chip and possibly a contactless communications device.

The payment terminals and the access control systems often have several readers to interact with these cards: a smart memory card reader, a magnetic memory card reader or even a contactless communications device.

3. PRIOR ART

Magnetic card readers compatible with the ISO 7811 standard have a magnetic stripe comprising three recording tracks. Encrypted data can be encoded on these stripes and can contain information related to the holder of the card or to a bank account.

When in use, the magnetic memory card is inserted into the extremity of a slot in a reader. A magnetic card reader is situated on one of the walls forming the slot, in such a way that the magnetic stripe faces the magnetic reading head.

When the card makes a motion of translation in the slot, the magnetic reading head comes into contact with the magnetic stripe. The magnetic reading head measures the polarization of the magnetic particles during the motion of translation to deduce digital information therefrom. During the reading operation, pressure is exerted on the magnetic head which must be capable of moving slightly in a direction perpendicular to the walls of the slot and undergo a slight tilting motion about this direction, while at the same time returning to its original position after passage of the card into the slot.

Many devices have been proposed for holding the magnetic card housing so as to most efficiently fulfill this function of guidance when the stripe is being read and the function of returning the reading head into its original position after the stripe has been read.

Major efforts have been made to reduce the dimensions and costs of manufacturing the terminals. The complexity and compactness of these terminals and the techniques for assembling their constituent elements entail essential problems in the design of these terminals.

These efforts of course relate to the designing of the magnetic card reader, which is a major element of such a terminal, and especially the device for holding the magnetic reading head.

The document WO2006/032824 proposes an especially compact device for holding the housing of a magnetic reading head. The device described consists of a single component comprising a base. The prior-art device of the document WO 2006/032824 also fulfils a function of affixation to the motherboard: holes are provided in the base to fix it by means of screws. The elastic deformation of the metal part prompts a pivoting motion of the magnetic reading head about an axis passing through holes for affixing the base. To ensure proper contact of the magnetic head on the magnetic stripe, the device enables the reading head to carry out a movement of rotation on itself about an axis, through apertures made in its housing. Protruding portions of the single component get inserted into the apertures of the housing of the head. Ultimately, the device is relatively complex.

4. SUMMARY OF THE INVENTION

The present disclosure relates to a component for holding a housing of magnetic reading head comprising a perforated plane surface appreciably of the same length and same width as the rear face of the housing of the reading head, two surfaces perpendicular to said perforated plane surface forming two mutually parallel lateral uprights intended to grip the housing of the magnetic reading head, and at least one affixation point.

Thus, the holding element has a limited size while at the same time having suitable elasticity to enable the reading of data coming from a magnetic track of a card.

The present disclosure also relates to a slotted magnetic card reader comprising a magnetic reading head held by such a holding element.

In at least one embodiment, the perforated plane surface of the holding element has a zigzag shape. This shape gives the part high elasticity with a very limited surface area.

In at least one embodiment, the holding component is metallic. This provides for efficient electrical connection with the ground of a slotted magnetic card reader.

In at least one embodiment, the component has two arms each bearing an affixation point with an aperture to be plugged into a supporting element affixed to the motherboard of a slotted magnetic card reader. The affixing of the reading head to the motherboard of a reader is thus made easy. The present disclosure also relates to such a reader comprising a motherboard on which a supporting element is affixed. The two apertures of the affixation points of the holding component are plugged into this supporting element. The disclosure relates in particular to such a reader where the supporting element is soldered to the motherboard, thus enabling easy mounting.

In at least one embodiment, the supporting element and the holding element are metallic and the supporting element is connected to the ground of the reader, enabling an excellent ground connection for the holding element.

5. FIGURES

Other features and advantages shall appear more clearly from the following description of a particular embodiment of the disclosure, given by way a simple illustratory and non-exhaustive example and from the appended drawings of which:

6. EMBODIMENT

Figure 1:
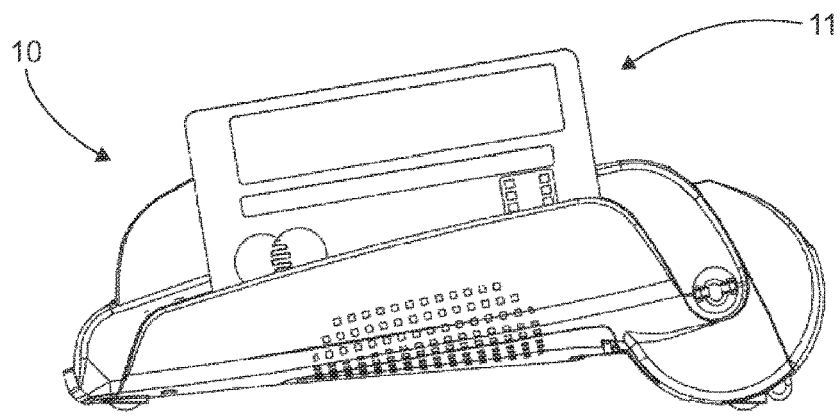
FIG. 1 shows an example of payment terminal comprising an extremely compact slotted magnetic card reader.

FIG. 1 represents a payment terminal 10 comprising an extremely compact slotted magnetic card reader or swipe reader into which a payment card 11 is inserted. As explained here below, a holding component compliant with the present technique can be used in the context of a terminal of this type.

Referring to FIGS. 2 to 9, we describe an embodiment of a holding component compliant with the present technique.

Figure 2:
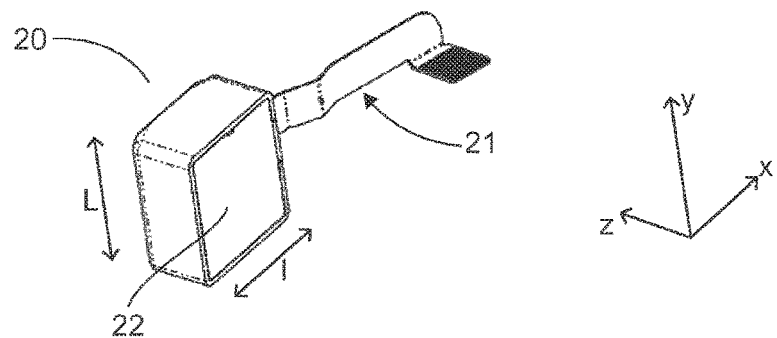
FIG. 2 illustrates a magnetic reading head.

FIG. 2 represents a housing of a magnetic reading head (20) provided with its connection cable (21). The housing (20) has a rear face (22) that is appreciably plane and parallel with the plane OXY, and has a length L and a width I. Quite classically, the data memorized in the magnetic stripe of a card (11) is read by putting the magnetic reading head situated on the front face of the housing (20) into contact with the magnetic stripe and then carrying out a translation of the card (11) while maintaining contact between the magnetic stripe and the reading head.

Figure 3:
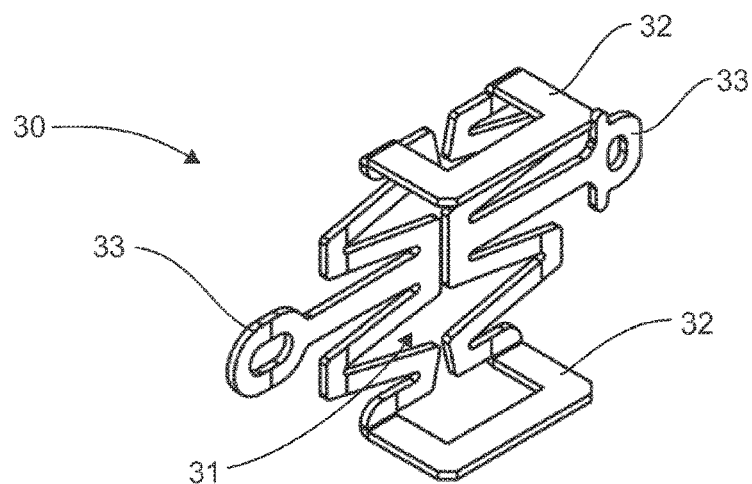
FIG. 3 represents an example of a holding element of the housing of the magnetic card reader according to the present innovation.

FIG. 3 represents an embodiment of a holding device (30) according to the present technique. This device consists of a single part (30) comprising a perforated plane surface (31), the length and the width of which are substantially equal to the length L and the width I of the rear surface (22) of the housing (20) of the magnetic reading head.

The single component (30) also has two lateral uprights (32) parallel to each other, between which the housing (21) of the reading head gets inserted. In the embodiment shown in FIG. 3, the two lateral uprights (32) grip the housing (21) along its width I. Naturally, a holding element (30) comprising uprights (32) gripping the housing (20) along its length L is an alternative embodiment that is also compliant with the disclosure.

The single component (30) comprises one or more affixation points (33) enabling the part (30) to be fixedly attached to the reader (10). In the particular embodiment shown in FIG. 3, two affixation points (33) are situated at the extremities of two side arms that extend slightly beyond the perforated plane surface (31) so as to facilitate the affixation of the part (30) to the reader (10) while at the same time maintaining its extreme compactness. This embodiment is an efficient compromise between gain in space and ease of use but, naturally, other positions of the affixation point or points (33) are possible within the framework of the present technique. For example, the affixation points (33) can be borne by longitudinal arms or else situated behind the holding component (30).

The recesses in the plane surface (31) give elasticity to the component (30) while preserving the rigidity of the lateral uprights (32) that grip the housing (21). When the magnetic card (11) passes into the slot of a reader (10) provided with the device (30), the card (11) exerts a thrust force on the front face of the reading head which tends to shift the housing (21) substantially in the direction Oz, leading to a deformation of the perforated plane surface (31). As a reaction, this surface exerts a return force appreciably along the direction Oz and thus provides efficient contact between the reading head and the magnetic track of the card (11) throughout the phase of translation of the card through the slot of the reader (10).

In the example of implementation shown in FIGS. 3 to 9, the recesses give the perforated plane surface (31) a zigzag or W shape. This shape is for example repeated on each side of the part (30) along the "y" axis of the Oxyz referential system of FIG. 2. In this embodiment, this separation of the surface (31) at its center along the "y" axis gives it increased flexibility and elasticity. In FIG. 3, the zigzag (or w) is oriented along the "x" axis of the Oxyz referential system. Naturally, the recesses can have other shapes while fulfilling the same function, i.e. giving the perforated plane surface (31) an elasticity that enables the holding component (30) to keep the reading head in contact with the stripe during the reading and limiting the dimensions L' and I' of the perforated plane surface (31) so that they are substantially equal to the dimensions L and I of the rear face (22) of the housing (20) of the reading head. In this way, the return force on the housing (20) enabling the magnetic reading head to be kept in contact with the magnetic stripe is produced by an elastic deformation of a flexible surface (31) situated behind the housing (20) maintained by the part (30). A W shape or zigzag shape oriented along the "y" axis can also give satisfactory results, for example by reducing the length of the lateral uprights. Another example would consist in giving a wave shape oriented along the "x" axis or "y" axis. The function of holding the housing (20) is also fulfilled by a single and extremely compact component (30).

When the housing (20) is inserted between the two lateral uprights (32) of the holding component (30), the unit can be handled without any risk of untimely or unwanted separation of the two elements.

According to one embodiment, the holding component (3) is metallic. The component (30) can then easily be connected to the ground of the reader (10).

In one embodiment, the holding component (30) of the housing (20) is associated with a supporting element designed so as to be fixed directly to the motherboard of the reader (10). An example of a supporting element (40) is shown in FIG. 4.

The supporting element (40) is designed as an electronic component and it is directly soldered to the motherboard of the reader (10), thus greatly facilitating its manufacture and assembly. It also enables the direct connection of the reader (10) to ground with a contact of excellent quality.

According to the example of implementation represented in FIGS. 3 to 9, the affixation points (33) of the holding component (30) comprise apertures that get plugged in by being clipped on to the supporting element (40).

Figure 4:
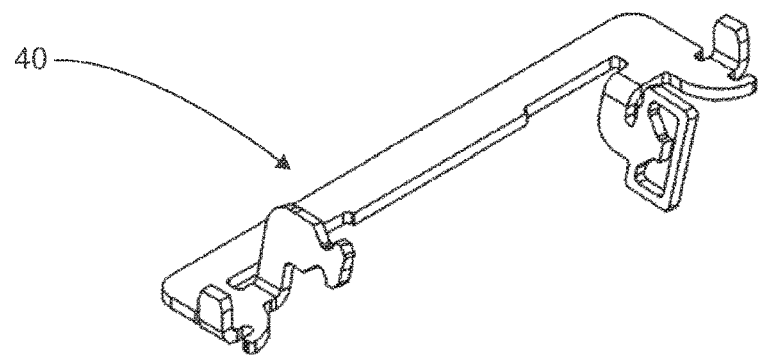
FIG. 4 represents a supporting element compliant with the present disclosure.
Figure 5:
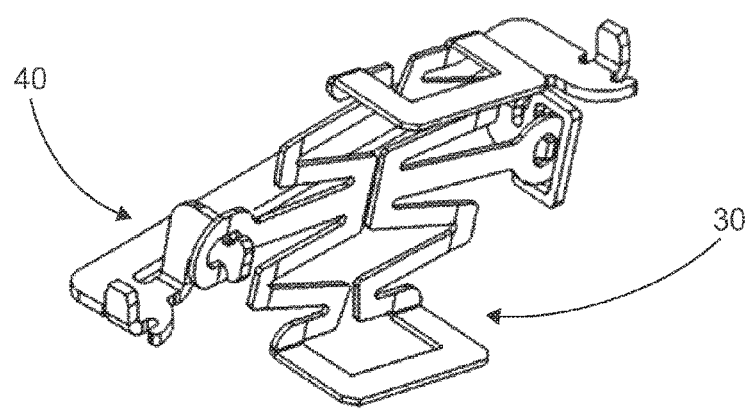
FIG. 5 shows the assembling of the holding component of FIG. 3 with the supporting element to FIG. 4.
Figure 6:
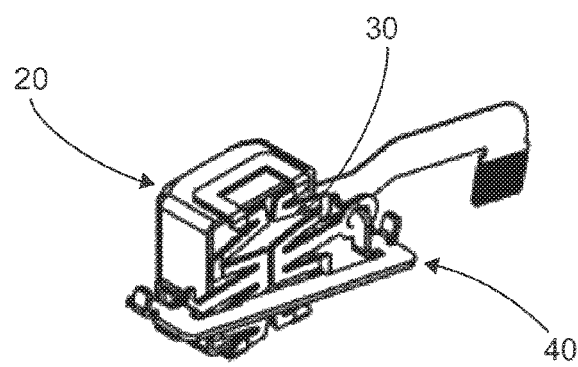
FIGS. 6 and 7 represent the holding element of FIG. 3 when it holds the reading head of FIG. 2, once assembled with the supporting element of FIG. 4.
Figure 7:
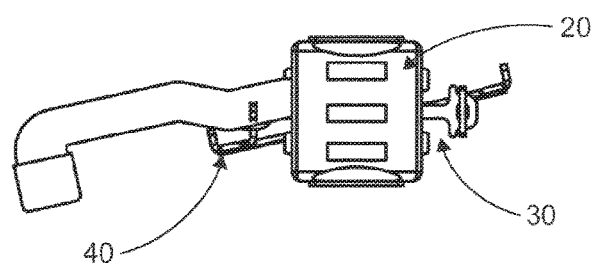

FIG. 5 represents the assembling of the holding component (30) of FIG. 3 and the supporting element (40) of FIG. 4. FIGS. 6 and 7 are respectively three-quarter rear and front views of the assembled unit when the housing (20) of a magnetic reading head is maintained by the holding component (30). FIG. 7 more particularly represents the assembled unit in a position of use, i.e. a position in which the assembled unit is inserted into the terminal of FIG. 1. As can be seen, the supporting element (40) is tilted relative to the horizontal plane by an angle of about 15 to 30 degrees while the magnetic head (20) (and its three reading tracks) and the holding device (30) are parallel to this same horizontal plane. The advantage of this arrangement is that it gives a terminal, the front face (the face comprising the keypad and the screen) of which is inclined and at the same time makes sure that the passage of the magnetic card into the magnetic card reader can be done horizontally. This offers greater ease of handling of the card in the reader and especially makes sure that the motion of translation of the card in the reader is done optimally. More particularly, it keeps the card in a penetrated position, parallel to the horizontal plane during the reading operation, and this is simpler for the user.

Figure 8:
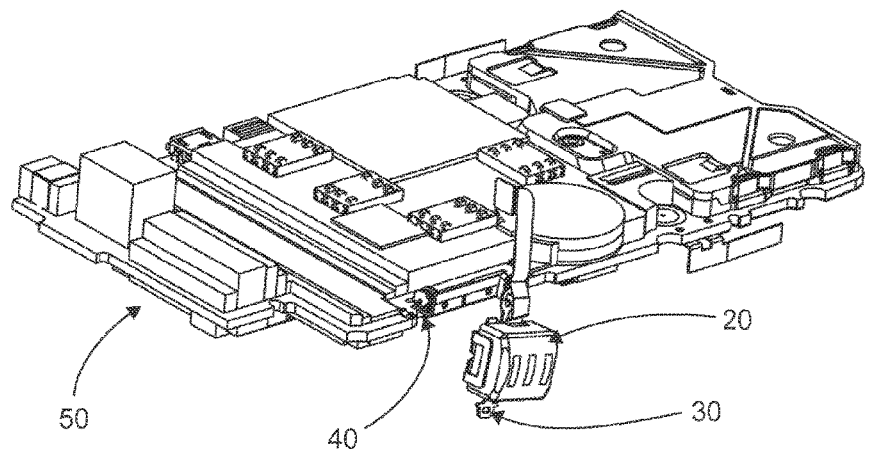
FIGS. 8 and 9 illustrate two steps for assembling the holding element to FIG. 3 with a supporting element of FIG. 4 which is soldered to a motherboard.
Figure 9:
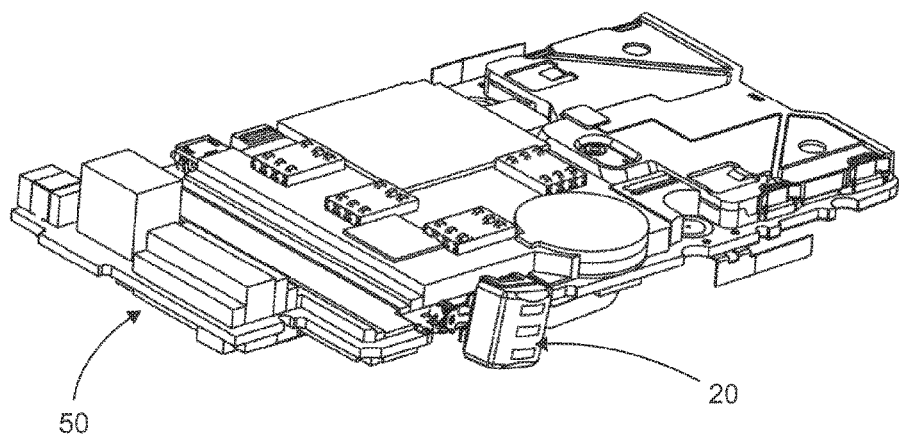

FIGS. 8 and 9 represent two steps of the assembling of the holding component (30) of FIG. 3 with the supporting element (40) of FIG. 4 pre-soldered to the motherboard (50) of the swipe reader (10). In a first step, shown in FIG. 8, the aperture of the affixation point (33) of the component (30) is plugged into the supporting element (40). Then, after having carried out a pivoting of the component (30), the aperture of the second affixation point (33) of the component (30) is also plugged into the supporting element (40). The motherboard (50) can then be handled without any risk that the holding component (30) or the reading head will get detached therefrom.

Thus, a description has been provided of a holding device (30) for holding a magnetic head comprising a single component (30) with dimensions even smaller than those of prior art devices. Associating the holding component (30) with the supporting element (40) dissociates the function of holding the housing (20) of the magnetic reading head from the function of affixing the reader (10) to the motherboard (50). The holding element (30) is then particularly easy to manufacture. The supporting element (40) is also particularly easy to manufacture and mount by the direct soldering to the motherboard (50) of a slotted magnetic card reader or swipe reader (10), in obtaining a perfect connection.

When the supporting element (40) and holding component (30) are both metallic, the link to the ground of the terminal (10) is optimal. This gives greater resistance against electrostatic discharges than is the case with prior art systems.

The present disclosure, in at least one embodiment, at least partially resolves certain problems raised by the prior art.

More specifically, it is a goal of at least one embodiment to provide a particularly compact component for holding a magnetic card reader.

It is also a goal of at least one embodiment to provide a component for holding a magnetic reading head, the method of manufacture of which is simple and costs little.

It is a goal of at least one embodiment to facilitate the fastening of a part for holding a magnetic reading head on the motherboard of a slotted magnetic card reader or swipe card reader.

Finally, it is a goal of at least one embodiment to improve the electrical link between a component for holding a magnetic reading head and the ground of a swipe card reader.

Although the present disclosure has been described with reference to one or more examples, workers skilled in the art will recognize that changes may be made in form and detail without departing from the scope of the disclosure and/or the appended claims.

The invention claimed is:

1. A component for holding a housing of a magnetic reading head of a magnetic card reader, wherein said component comprises:
 a perforated plane surface appreciably of the same length and same width as a rear face of the housing of the reading head, said perforated plane surface having a zigzag shape,
 first and second surfaces perpendicular to said perforated plane surface that form first and second mutually parallel lateral uprights configured to grip the housing of the magnetic reading head, and the plane surface is disposed so as to face the rear face of the housing of the reading head, and
 at least one affixation point.

2. The component according to claim 1, wherein the component has first and second arms, each bearing an affixation point with an aperture to be plugged with a supporting element fixed to a motherboard of a slotted magnetic card reader.

3. The component according to claim 1, wherein the component is metallic.

4. A slotted magnetic card reader comprising:
 a magnetic reading head comprising a housing with a rear face; and
 holding component holding the housing of the magnetic reading head, wherein the component comprises:
 a perforated plane surface appreciably of the same length and same width as the rear face of the housing, wherein the perforated plane surface has a zigzag shape,
 first and second surfaces perpendicular to said perforated plane surface, which form first and second mutually parallel lateral uprights that grip the housing of the magnetic reading head, and wherein the plane surface faces the rear face of the housing, and
 at least one affixation point, which affixes the holding component on the magnetic card reader.

5. The slotted magnetic card reader according to claim 4, further comprising a motherboard to which there is affixed a supporting element; and
 wherein the holding component has first and second arms, each bearing an affixation point with an aperture, which is plugged with the supporting element.

6. The slotted magnetic card reader according to claim 5, wherein the supporting element is soldered to the motherboard.

7. The slotted magnetic card reader according to claim 5, wherein the supporting element is connected to a ground of the reader and the supporting element and the holding component are metallic.

* * * * *